US009053466B2

(12) United States Patent
Caceres (10) Patent No.: US 9,053,466 B2
(45) Date of Patent: Jun. 9, 2015

(54) PUBLISHING AND SUBSCRIBING TO CALENDAR EVENTS INFORMATION VIA CATEGORICAL MAPPING METHODOLOGY

(75) Inventor: Barry M. Caceres, Las Vegas, NV (US)

(73) Assignee: International Business Machines Corporation, Armonk, NY (US)

( * ) Notice: Subject to any disclaimer, the term of this patent is extended or adjusted under 35 U.S.C. 154(b) by 1048 days.

(21) Appl. No.: 11/933,176

(22) Filed: Oct. 31, 2007

(65) Prior Publication Data

US 2009/0112986 A1 Apr. 30, 2009

(51) Int. Cl.
G06F 17/30 (2006.01)
G06Q 10/10 (2012.01)

(52) U.S. Cl.
CPC .................. G06Q 10/109 (2013.01)

(58) Field of Classification Search
CPC ................................ G06F 17/30867
USPC ................... 707/611, 618, 624, 631, 638
See application file for complete search history.

(56) References Cited

U.S. PATENT DOCUMENTS

| 5,412,807 | A | 5/1995 | Moreland |
| 5,664,172 | A | 9/1997 | Antoshenkov |
| 5,884,304 | A | 3/1999 | Davis, III et al. |
| 5,924,089 | A | 7/1999 | Mocek et al. |
| 5,950,190 | A | 9/1999 | Yeager et al. |
| 6,035,311 | A | 3/2000 | McCool et al. |
| 6,111,574 | A | 8/2000 | Meek |
| 6,430,552 | B1 | 8/2002 | Corston-Oliver |
| 6,453,312 | B1 | 9/2002 | Goiffon et al. |
| 6,658,095 | B1 | 12/2003 | Yoakum et al. |
| 6,658,407 | B1 | 12/2003 | Bailey |
| 6,748,377 | B1 | 6/2004 | Attaluri |
| 6,768,997 | B2 | 7/2004 | Schirmer et al. |

(Continued)

FOREIGN PATENT DOCUMENTS

| JP | 10134078 | 5/1998 |
| JP | 11102375 | 4/1999 |
| JP | 2006155663 | 6/2006 |

OTHER PUBLICATIONS

G. Salton et al. "Automatic Query Formulations in Information Retrieval." Journal of the American Society for Information Science. Jul. 1983 vol. 34(4): pp. 262-280.

(Continued)

*Primary Examiner* — Sana Al Hashemi
(74) *Attorney, Agent, or Firm* — Patterson & Sheridan, LLP (57) ABSTRACT

A system, method and program product for publishing and subscribing to calendar events publication are disclosed. In one aspect, method and system for providing a publication of calendar events for one or more computer-based devices having a calendaring system capable of operation therein, is disclosed. The method and system comprises defining one or more calendar publication definitions. The definitions comprise an identifier for the publication and a set of criteria for qualifying calendar events from a calendar database for inclusion in and/or exclusion from the publication. The method and system include activating a publication agent for processing each publication definition by applying the qualifying criteria to the calendar database to create a subset of qualified calendar events from the calendar database to be included in the publication. Furthermore, the method and system include aggregating the qualified calendar events into a single identifiable calendar publication making the calendar publication available.

25 Claims, 7 Drawing Sheets

(56) References Cited

U.S. PATENT DOCUMENTS

| | | |
|---|---|---|
| 6,915,290 B2 | 7/2005 | Bestgen et al. |
| 6,947,934 B1 | 9/2005 | Chen et al. |
| 8,229,940 B2 | 7/2012 | Allen et al. |
| 2002/0059297 A1 | 5/2002 | Schirmer et al. |
| 2002/0123984 A1 | 9/2002 | Prakash |
| 2003/0120682 A1 | 6/2003 | Bestgen et al. |
| 2003/0163455 A1 | 8/2003 | Dettinger et al. |
| 2004/0068489 A1 | 4/2004 | Dettinger et al. |
| 2004/0139060 A1 | 7/2004 | Maxwell |
| 2004/0172520 A1 | 9/2004 | Smit et al. |
| 2004/0215638 A1 | 10/2004 | Kapoor et al. |
| 2005/0004911 A1 | 1/2005 | Goldberg et al. |
| 2005/0071326 A1 | 3/2005 | Brown et al. |
| 2005/0192940 A1 | 9/2005 | Morris |
| 2005/0278306 A1 | 12/2005 | Dettinger et al. |
| 2006/0084410 A1 | 4/2006 | Sutaria et al. |
| 2006/0100989 A1 | 5/2006 | Chinchwadkar et al. |
| 2006/0116999 A1 | 6/2006 | Dettinger et al. |
| 2006/0195427 A1 | 8/2006 | Kilroy |
| 2006/0277157 A1 | 12/2006 | Seidl et al. |
| 2007/0027845 A1 | 2/2007 | Dettinger et al. |
| 2007/0027917 A1* | 2/2007 | Ariel et al. ................ 707/104.1 |
| 2007/0073657 A1 | 3/2007 | Santosuosso |
| 2007/0112727 A1 | 5/2007 | Jardine et al. |
| 2007/0129986 A1 | 6/2007 | Barnett et al. |
| 2007/0266017 A1 | 11/2007 | Held et al. |
| 2008/0133570 A1 | 6/2008 | Allen et al. |
| 2008/0134292 A1* | 6/2008 | Ariel et al. ........................ 726/3 |
| 2009/0024593 A1 | 1/2009 | Allen et al. |
| 2010/0161646 A1 | 6/2010 | Ceballos et al. |

OTHER PUBLICATIONS

G. Salton et al. "A Comparison of Two Methods for Boolean Query Relevancy Feedback." Information Processing & Management. 1984 vol. 20(5/6): pp. 637-651.

G. Salton et al. "A Simple Blueprint for Automatic Boolean Query Processing." Information Processing & Management. 1988 vol. 24(3): pp. 269-280.

Fosca Giannotti et al. "Specifying Mining Algorithms with Iterative User-Defined Aggregates." IEEE Transactions on Knowledge and Data Engineering. Oct. 2004 vol. 16(10): pp. 1232-1246.

* cited by examiner

Publication Name: Barry's 2007 Schedule

Event Matching Criteria

| Event Field | Comparison Operator | Comparison Value |
|---|---|---|
| Category | Equals | IBM |
| Category | Equals | Personal |
| Private | Not Equal To | True |
| Event Date | Greater-Than or Equal-To | 2007/01/01 |

*Add more criteria*

[ Next ]

Publication Name: Barry's 2007 Schedule

Field Privacy Rules

| Action | Event Field | Parameters | | |
|---|---|---|---|---|
| Exclude | Notes | Always | | |
| Replace | Title | with IBM Meeting | When | |
| | Event Field | Comparison Operator | | Comparison Value |
| | Category | Equals | | IBM |

*Add more criteria*

| Exclude | Description | When | | |
|---|---|---|---|---|
| | Event Field | Comparison Operator | | Comparison Value |
| | Category | Equals | | IBM |

*Add more criteria*

*Add more rules*

[ Previous ] [ Next ]

500   FIG. 5   510

Publication Name: Barry's 2007 Schedule

☑ Restrict Access

- ☐ joeschmoe
- ☐ johndoe
- ☑ janedoe
- ☐ bobsmith
- ☐ robsmith

[Remove Users] [bcaceres] [Add User]

[Previous] [Next]

Publication Name: Barry's 2007 Schedule

☑ Make available on-demand via PDA synchroniztion conduit

☑ Publish to file system
Path: C:\calendar\pubs\Barry2007.vcal  [Browse]

☑ Export to website
Host: www.mywebsite.com   Port: 80
Path: /calendar/pubs/Barry2007.rss

[Previous] [Finish]

Subscription Name: Barry's Work Schedule

○ Subscribe via PDA synchronization using local publications
Publication Name: Barry's 2007 Schedule ○ Subscribe via remote PDA synchronization conduit
Host: 192.167.1.8   Port: 4040
Publication Name: Barry's 2007 Schedule ○ Subscribe via export file on file system
Path: C:\calendar\pubs\Barry2007.vcal   [Browse]

⦿ Subscribe via RSS feed
Host: www.mywebsite.com   Port: 80
Path: /calendar/pubs/Barry2007.rss

[Next]

Subscription Name: Barry's Work Schedule

☑ Exclude Events Matching Criteria

| Event Field | Comparison Operator | Comparison Value |
|---|---|---|
| Title ▾ | Does Not Start With ▾ | IBM Meeting |

*Add more criteria*

[ Previous ] [ Next ]

Subscription Name: Barry's Work Schedule

Field Import Rules

| Action | Event Field | Parameters | |
|---|---|---|---|
| [ Replace ] | [ Category ] | with Barry-Work | [ Always ] |
| Prefix ▾ | Title ▾ | with Barry: | Always ▾ |

*Add more rules*

[ Finish ]

1000    *FIG. 10*    1010

PUBLISHING AND SUBSCRIBING TO CALENDAR EVENTS INFORMATION VIA CATEGORICAL MAPPING METHODOLOGY

CROSS REFERENCE TO CO-PENDING APPLICATION

Incorporated herein by reference are the teachings and disclosures of co-pending patent application "A Query Predicate Generator to Construct a Database Query Predicate from Received Query Conditions," filed Jul. 16, 2007, having U.S. patent application Ser. No. 11/778,622.

FIELD OF THE INVENTION

The present invention relates generally to scheduling and related software, and more particularly but not exclusively to coordinated methodologies for sharing calendar-based information across varying users.

BACKGROUND OF THE INVENTION

Software-driven calendar systems have become critical and informative tools across a variety of markets essentially wherever scheduling and calendaring has value. Examples of the importance of calendaring information (i.e., scheduling meetings, coordinating activities, referring to digitally-based calendar and notice systems, etc.) are apparent in virtually all levels of activities across most age groups, be the activities focused on work-based needs or personal matters. Additionally, digital calendars and digital agenda organizers have also become pervasive in traditionally non-calendar-based tools such as cell phones, personal computers, entertainment devices and the like.

As used herein, the terms "calendar" and "schedule" are intended to be used in their singular or plural meanings for digital, electronic or software-based applications and systems, and are further intended to include but not be limited to calendars that are web-based, resident in applications, reside on computer or personal electronic devices, present in mobile or fixed assets, code-based or rely on coded instructions through software programs or program products, and the like. The terms are further inclusive of calendars which are interactive with a user or users, real-time or locally-based, and include mechanisms and instructions to display their contents in various display mediums available to one or more users. The use of calendar herein is further intended to include timesheets, appointments, calendars, diaries, event listings, and physical calendars which are electronic and/or are capable of digital conversion directly or through an intermediary application, or other electronic transfer agent to a digital environment or file system.

As used herein, the term "device," is intended to be inclusive of computer-based equipment such as desktops, laptops, servers, personal digital assistants (PDAs), mobile communication systems, phones, entertainment systems, and the like, whether fixed, mobile or capable of being moved, without limitation.

The pervasive use of calendars across diverse organizations, settings and social groups, has also facilitated the need for calendar information, such as content and meeting details, to be shared and coordinated with others who have common needs in the shared content. In many cases calendar events pertain to more than one person or are of interest to more than one person or need to be recorded on multiple calendars of the same person. In instances where multiple people are involved, conventional calendars provide sharing calendar events such as meeting invitations, group calendars, and allowing other users to view one's own calendar, a subset of one's own calendar, or one's free/busy time. Conventional calendaring systems also allow for users to specifically select one or more calendar events and export them from one calendar and into another calendar. Other conventional calendaring systems provide for synchronization of an entire calendar with another. Such systems typically provide for synchronization between a desktop/laptop calendar and a mobile device or between a server-based calendar and one or more client calendars. There are, however, limitations in these systems for sharing calendar events.

Meeting invitations provide a mechanism that works well when the persons who are interested are known to a meeting chair. They also provide for synchronization of changes made to the meeting by the chair to participants. The chair is able to ascertain who has declined, accepted, or tentatively accepted the meeting as well as see proposals for alternate meeting locations, times, and requests for information. Meeting invitations, however, fall short of addressing cases where the interested parties for the calendar event are not known to the meeting chair.

For example, a professional sports team may have a posted calendar of games for the season with opponent, location (home or away) and times. The sports team, however, would not feasibly be able to send meeting invitations to every fan (ticket-holding or not) who might want to have the calendar events for those games in their own calendars. Another limitation of a meeting invitation is that the chair defines the contents of the calendar event and the participant is unable to customize the fields of the calendar event within their own calendar without copying the event and manually changing it. Also, meeting invitations provide a mechanism for sharing only a single event with possible repeating occurrences. They do not, however, work well for a plurality of different events that are not repeating occurrences of the same event.

Further, all parts of a meeting event are typically visible to all meeting participants even if there are some items that are confidential to the meeting chair or a subset of the meeting participants. Finally, synchronization of meeting invitations does not work well when the parties involved in the meeting are utilizing different calendar software. In such cases one typically exports the calendar event for the meeting and sends the exported event to the meeting participants to import into their own calendars. A synchronization of changes to a meeting utilizing this single event export/import mechanism would require manual deletion of the old version of the event or else result in a duplicate meeting event being created.

Group calendars allow one or more users to manage the events in a calendar and allow one or more users to access the events in the group calendar. Users can easily see and change shared items, but once again the group of interested users must be known to each other and a coordinated effort must be made to direct the group of interested users to the group calendar. Further, users of a group calendar can typically see all fields of each calendar event on the group calendar and there is no way to restrict confidential fields to a subset of the group for one or more of the contained calendar events.

Users of a group calendar can typically specifically select and export one or more events from the group calendar and import them into another calendar, but there is no means to periodically synchronize changes between the group calendar and the individual calendars to which events have been exported. The interested party can manually modify an event after importing it to change how it appears in their own calendar to match their own preferences, but this process is tedious if dealing with multiple events.

It is also difficult to maintain such changes if changes to the event in the source calendar and necessitate that the event be re-exported into the target calendar. Some have tried to overcome the synchronization problem by creating calendar views that access multiple calendar databases and provide overlays, but this ties the calendar user to specific software and makes it difficult to synchronize such changes when a user has two copies of their own calendar (e.g.; one on their desktop computer and one on their mobile device).

Another mechanism for sharing calendar events is giving specific users access to one's own calendar or giving the general populous of users access to one's own calendar (i.e.: public access). In such implementations, one can typically mark one or more calendar events as "private" to prevent it from being viewed or one can restrict calendar access to only view "free" or "busy" time without providing any details on the calendar events. Further, when one is able to view calendar events from a calendar, one may be able to select one or more events to export from that calendar and import into another. Again, manual modification of an event after importing is possible, but we have the same difficulty that was previously noted when dealing with multiple events and problems synchronizing changes to the event from the source calendar. The mechanism of sharing one's own calendar with others lacks fine-grained control of visibility of calendar event fields and lacks the ability to automatically synchronize changes to the source calendar events in the target calendar.

Conventional calendar synchronization mechanisms provides for sharing of calendar events between two calendars typically belonging to the same user. Such synchronization mechanisms typically provide for synchronization of server-based calendars with client-based calendars or desktop/laptop calendars with mobile device/PDA calendars. These conventional mechanisms operate on the entire calendar rather than a subset of the calendar events within the calendar. These mechanisms typically offer two modes of synchronization. The first is a two-way synchronization where the two calendars are meant to be mirrors of each other and changes in each are reflected in the other. This mode of operation typically requires some sort of manual intervention or preference selection to resolve conflicts when they occur. The second is a master/subordinate relationship where the subordinate calendar is modified to match the master calendar after synchronization (master overwrites subordinate). Because these mechanisms synchronize the entire calendar database there is no means provided to synchronize the subordinate calendar with multiple master calendars and maintain the events from each of those masters. This is due to the fact that synchronization leads to deletion of events in the subordinate calendar and a complete overwrite with the events in the master calendar in order to cause it to match the master calendar.

Accordingly, using the traditional approaches, although able to provide calendar information in limited formats to limited audiences, they present challenges to communications and information sharing for present and future needs.

For instance, traditional approaches typically require that the users (i.e., participants, attendees, meeting coordinators, etc.) have common software applications or minimally reside on common networks with common database access. In effect, the traditional approaches are unable to accommodate broader participation than organizational-styled directories.

Traditional approaches also prevent an uninvited user from "adding" a calendar event to his own calendar unless he does so manually, whereafter, synchronization and updates of the particular event do not precipitate to the uninvited user unless he updates manually based on other information received through the organization.

Further, using a traditional approach, a viewer of a calendared event is unable to customize the displayed view for their own preferences. For instance, in certain meeting notices, the content may be excessive or CPU-intensive to display, such that a user may wish to not be distracted by the excessive content or to maintain the computer's abilities without a draw from a meeting notice. Using the traditional approach, customized or preferential masking is not possible. Similarly, a fine-grain masking of fields of content is unable to be performed using traditional approaches, thereby further limiting calendaring options for a user.

Still further, traditional approaches do not provide for users to authorize a first group of viewers for one group of events at one level of detail and another group of viewers for a second potentially-overlapping group of events at another level of detail.

Finally, traditional approaches for synchronization do not provide for synchronization of the contents of a subordinate client calendar with the contents of multiple master calendars thereby forming a union of the events in those master calendars on the client calendar.

Therefore, it is highly desired to be able to provide a solution which overcomes the shortcomings and limitations of the present art and more particularly provides a calendaring system and method for publishing groups of calendar events and subscribing to publications by mapping calendar events to predetermined categories of interest.

The present invention in accordance with its various implementations herein, addresses such needs.

SUMMARY OF THE INVENTION

A system, method and program product for publishing and subscribing to calendar events publication are disclosed. In one aspect, method and system for providing a publication of calendar events for one or more computer-based devices having a calendaring system capable of operation therein, is disclosed. The method and system comprises defining one or more calendar publication definitions. The definitions comprise an identifier (such as a name) for the publication and a set of criteria for qualifying calendar events from a calendar database for inclusion in and/or exclusion from the publication.

The method and system include activating a publication agent for processing each publication definition by applying the qualifying criteria to the calendar database to create a subset of qualified calendar events from the calendar database to be included in the publication. Furthermore, the method and system include aggregating the qualified calendar events into a single identifiable calendar publication; and making the calendar publication available to one or more subscribers.

In another aspect, a method and system for subscribing to a publication of calendar events for one or more computer-based devices having a calendaring system capable of operation therein is disclosed. The method and system comprise defining one or more calendar subscription definitions. The definitions comprising: an identifier (such as a name) for the subscription; a locator or identifier to find and access a publication of calendar events; and a transformation rule to map the calendar events from the publication to one or more categories in the subscriber calendar. The method and system further includes activating a subscription agent for processing each subscription definition by removing existing events in the subscriber calendar that belong to the one or more categories to which calendar events from the publication may be mapped; retrieving the calendar events from the designated publication of calendar events; transforming the retrieved calendar events according to the defined transformation rule in order to map the category of each event to the one or more subscriber categories for the publication. Finally, the method and system include loading the transformed calendar events from the publication into a subscriber's calendar database with the mapped category values.

Accordingly in various implementations a calendar event publication is provided that is tailored specifically to the needs of a user or a particular set of users more effectively than utilizing conventional calendaring systems.

DETAILED DESCRIPTION

The present invention relates generally to scheduling and related software, and more particularly but not exclusively to coordinated methodologies for sharing calendar-based information across varying users.

The following description is presented to enable one of ordinary skill in the art to make and use the invention and is provided in the context of a patent application and its requirements. Various modifications to the preferred embodiments and the generic principles and features described herein will be readily apparent to those skilled in the art. Thus, the present invention is not intended to be limited to the embodiments shown, but is to be accorded the widest scope consistent with the principles and features described herein.

As used herein, as will be appreciated, the invention and its agents, in one or more implementations, separately or jointly, may comprise any of software, firmware, program code, program products, custom coding, machine instructions, scripts, configuration, and applications with existing ETL software, and the like, without limitation.

As used herein the term "publication" is intended to mean a group of one or more calendar events which is made available using the present invention having events therein which were first selected from one or more calendars having events therein each of which having characteristics that satisfied one or more predetermined criteria.

In various implementations of the present invention, a system, method and program product are provided for publishing and subscribing to event publications using one or more agents, without necessitating modification to schema of the subscriber's calendar database, thereby enhancing the interoperability of existing calendar applications without necessitating removal of applications.

To describe the features of the present invention in detail, refer now to the following description in conjunction with the accompanying figures.

Figure 1:
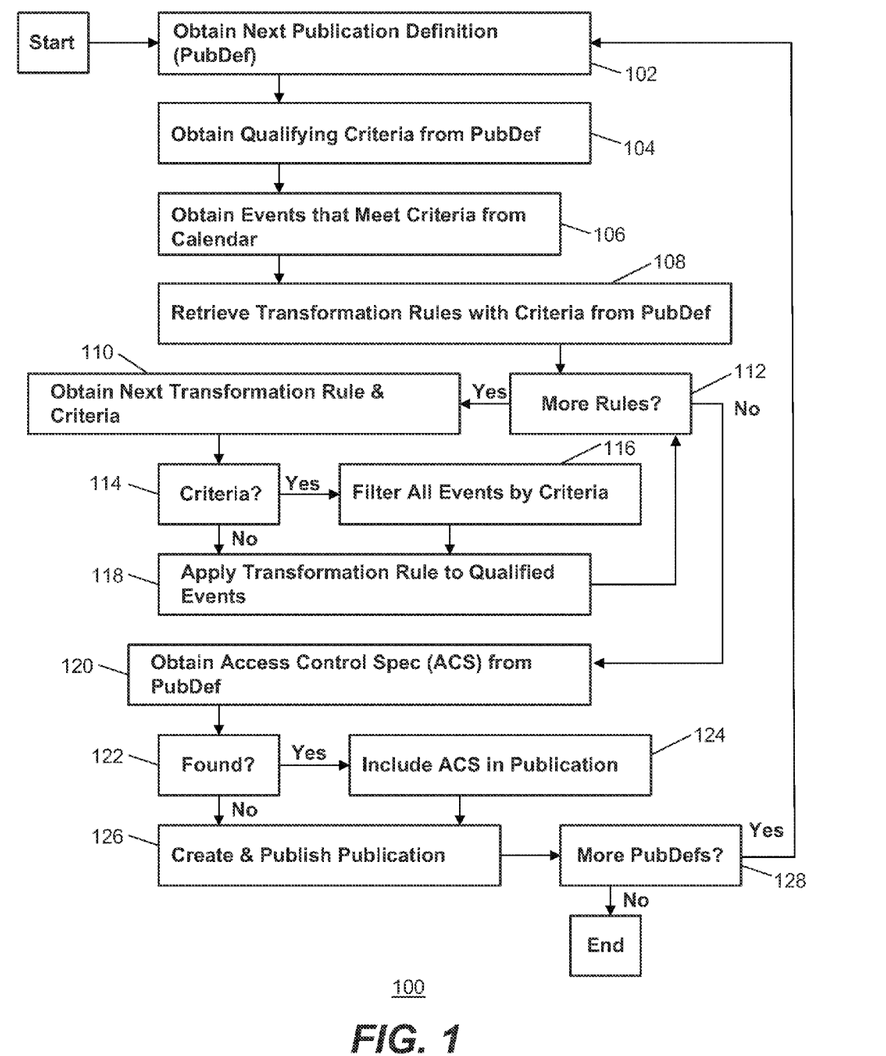
FIG. 1 depicts a method for a publication agent that is activated periodically for creating publications of different calendar events in one implementation of the present invention.
Figure 5:
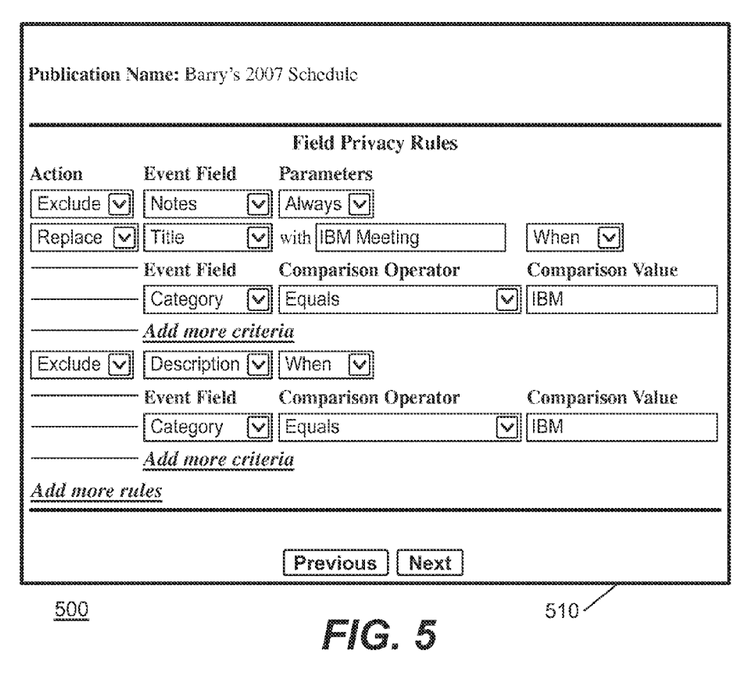
FIG. 5 depicts a screen to define a transformation rule set as part of a publication definition for modifying or excluding the content of fields of calendar events included in the publication of the present invention in accordance with one or more implementations thereof.

FIG. 1 depicts a method 100 for creating publications of different calendar events utilizing a publication agent that is activated periodically in one implementation of the present invention. In this method, a publication definition is obtained, via step 102. Once the publication definition is obtained, then qualifying criteria from the publication definition is obtained, via step 104. Thereafter, the calendar events that meet the criteria are obtained from the calendar, via step 106. These criteria, for example, could be concerning a meeting between this date and a predetermined date. Thereafter, a transformation rule with criteria from the public definition is retrieved, via step 108. Referring to FIG. 5, as is seen, an example of the criteria would be shown at where it refers to Action, replace title with IBM meeting when category equals IBM. Where we have "When" selected in the drop-down box instead of "Always" the indented lines below define the criteria for the transformation, such as "category equals IBM".

Thereafter, it is determined if there are more transformation rules, via step 112. If there are more transformation rules, then the next transformation rule is obtained, via step 110. In step 114, it is determined whether there are criteria associated with the transformation rule. If there are no criteria, then the transformation rule is applied to qualifying events directly via step 118. If there are criteria, then all the calendar events are filtered by the criteria, via step 116, before applying the transformation rule to all qualified calendar events, via step 118.

Next again, it is determined if there are more rules, via step 112. This cycle is repeated until all the transformation rules are obtained and processed. When it is determined that there are no remaining transformation rules to process, via step 112, then an access control specification (ACS) is obtained from the publication definition via step 120. This access control specification is illustrated, for example, in FIG. 6, which is a listing of the various users that could have access to the publication, for example, in this embodiment, Jane Doe has been checked as having the ability to have access to the publication by the ACS. If it is determined that the publication definition contains an ACS, via step 122, the ACS is included in the publication, via step 124. If on the other hand, the ACS was not found, then proceed directly to create and publish the publication without the ACS, via step 126. In both instances, either from step 122 or 124, the publication is created and published, via step 126. Finally, it is determined whether there are more publication definitions that need to be processed, via step 128. If the answer is yes, then it is returned to step 102 and repeat the process. If the answer on the other hand is no, then the process ends.

Figure 2:
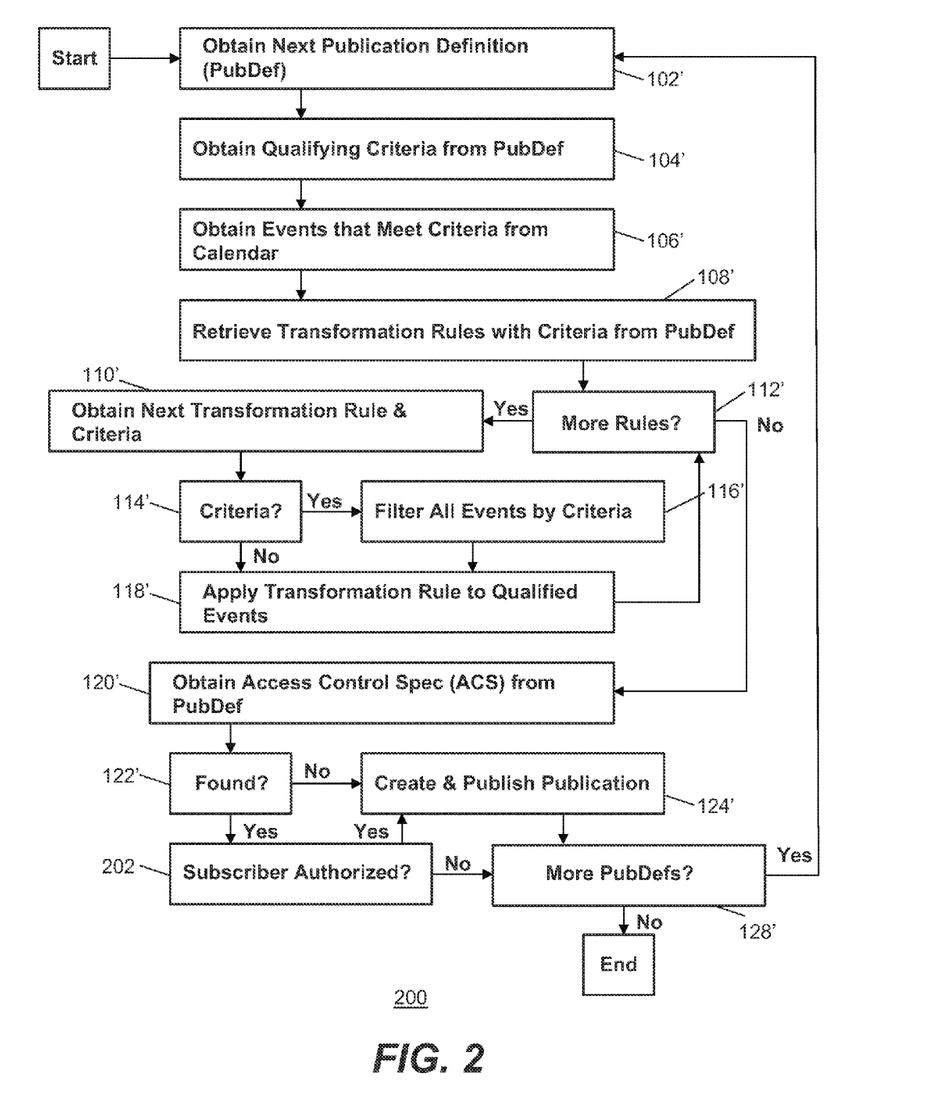
FIG. 2 depicts a method for a publication agent that is activated upon subscriber request for creating publications of different calendar events in one implementation of the present invention.

FIG. 2 depicts a method 200 for creating publications of different calendar events utilizing a publication agent that is activated upon a subscriber request in one implementation of the present invention. For example, in this embodiment a person may want to HotSync their PDA to a computer. The steps of this process are substantially the same as FIG. 1 except after it is determined that an ACS is found via step 122', then it must be determined if the subscriber is authorized, via step 202. If the answer is no, it is determined if there are more publication definitions, via step 128'. Accordingly, the subscriber would not have access to that particular publication since the subscriber is not authorized. However, if the subscriber is authorized, via step 202, then the publication is created and published, via step 126'.

Figure 3:
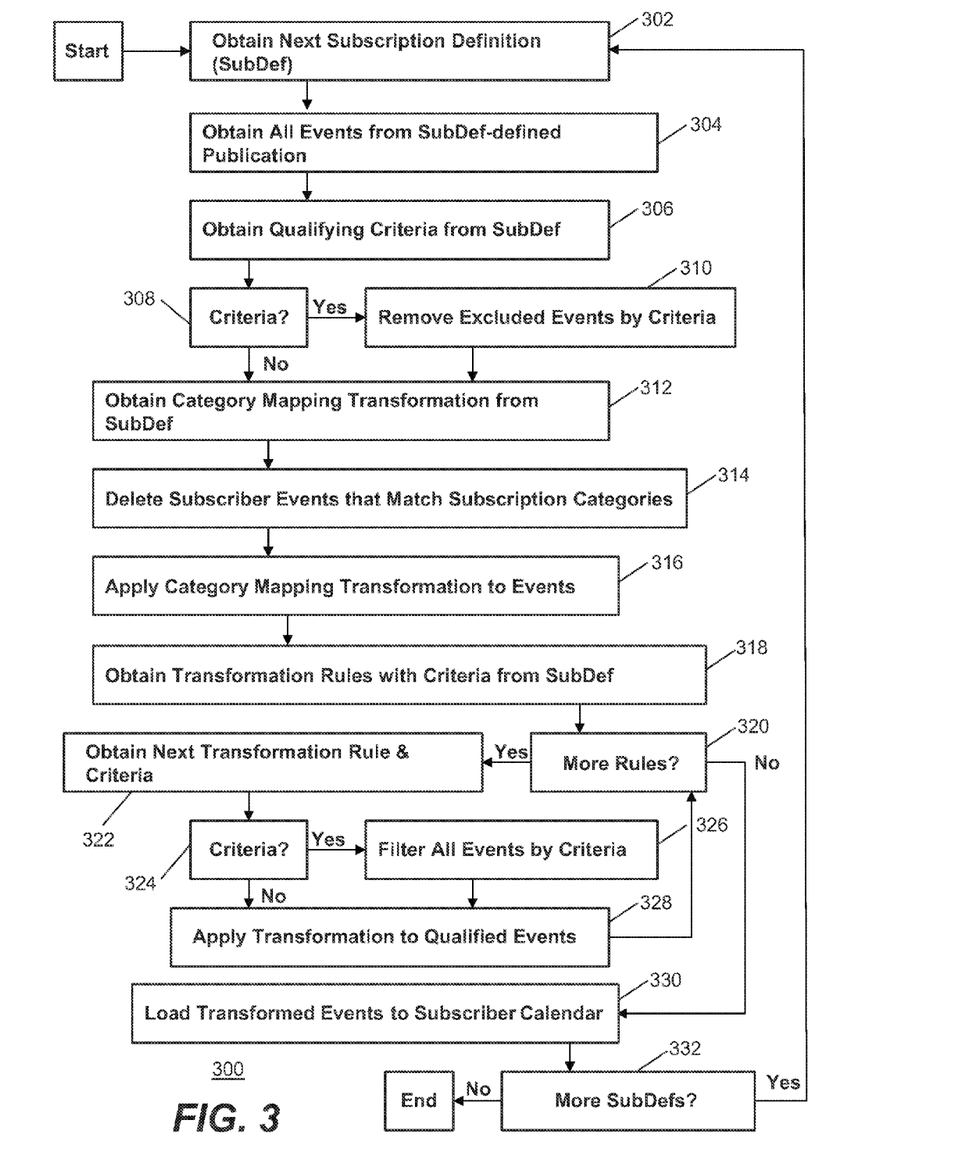
FIG. 3 depicts a method for a subscription agent for synchronizing with one or more subscribed-to publications of calendar events in one implementation of the present invention.
Figure 8:
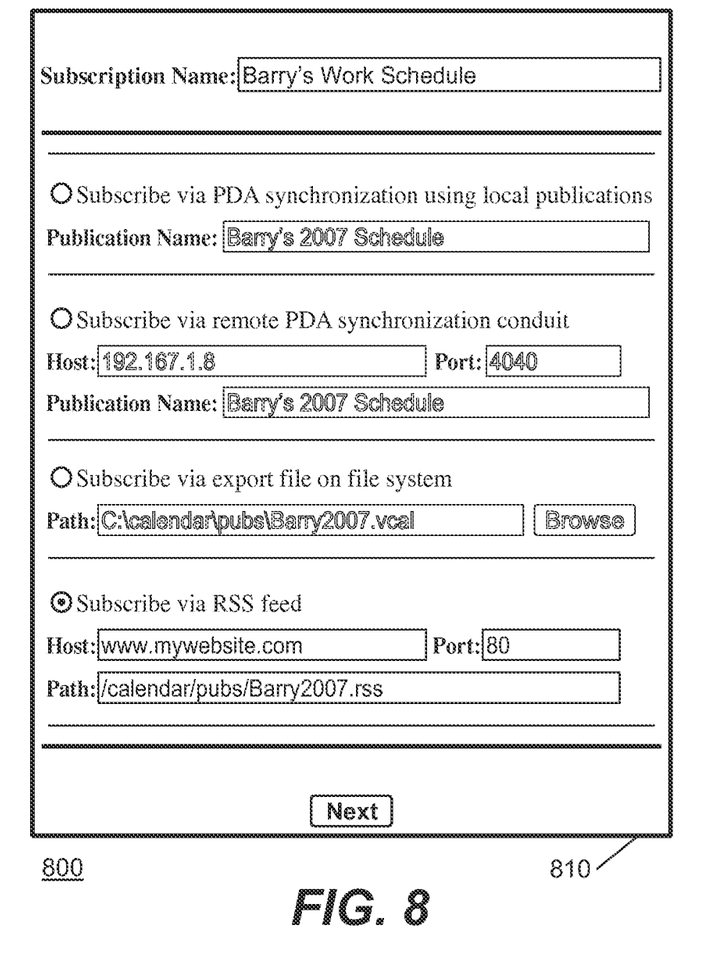
FIG. 8 depicts a screen for defining the medium for subscribing to a publication in the subscription definition of the present invention in accordance with one or more implementations thereof.
Figure 9:
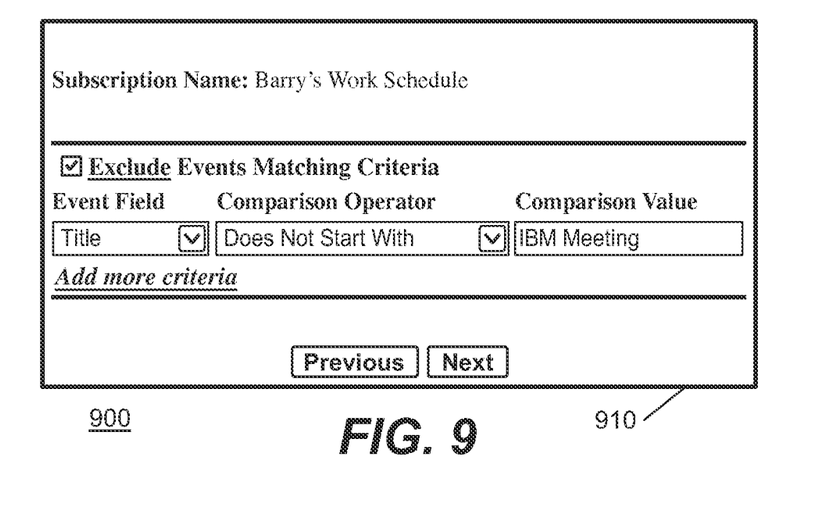
FIG. 9 depicts a screen for defining criteria to qualify events for inclusion in or exclusion from the subset of events from the publication that make up the subscription of the present invention in accordance with one or more implementations thereof; and, FIG. 10 depicts a screen to define a transformation rule set as part of a subscription definition for modifying or excluding the content of fields of calendar events from the publication for the subscription of the present invention in accordance with one or more implementations thereof.

Finally, it is desirable for a subscriber to obtain a publication of calendar events from a publisher. FIG. 3 depicts a method 300 for synchronizing with one or more subscribed-to publications of calendar events utilizing a subscription in one implementation of the present invention. First, a subscription definition is obtained, via step 302. These definitions define the publication that the subscriber is subscribing to. Next, all calendar events are obtained from the publication defined by the subscription definition, via step 304. An example of this is shown in FIG. 8. This will be discussed in detail later in the specification. Next, the qualifying criteria is obtained from the subscription definition, via step 306. An example of this is shown in FIG. 9. Next it is determined if there are qualifying criteria for events. If criteria exists, the events that do not qualify for the subscription according to the criteria are deemed "excluded" and are removed from further consideration, via step 310 and the remaining events are provided to step 312. If the answer is no, all of the calendar events are provided to step 312.

Next the category mapping transformation from the subscription definition are obtained. Calendar events from the subscriber calendar are deleted where those events have the subscription categories to ensure that old events are removed, via step 314.

Thereafter, a category mapping transformation is applied to the calendar events obtained from the publication, via step 316. Then, transformation rules with qualifying criteria are obtained from the subscription definition, via step 318.

Thereafter, it is determined if there are more transformation rules, via step 320. If there are more transformation rules and criteria, then the next transformation rule is obtained, via step 322. In step 324, it is determined whether there are criteria associated with the transformation rule. If there are no criteria, then the transformation rule is applied to qualifying events directly via step 328. If there are criteria, then all the calendar events are filtered by criteria, via step 326, before applying the transformation rule to all qualified calendar events, via step 328.

Once there are no more rules, via step 320, the transformed events are then loaded to a subscriber calendar, via step 330. Finally, it is determined if there are more subscription definitions, via step 332. If there is are more subscription definitions, then repeat the process at step 302 until there are no more subscription definitions.

Described below are example implementations of the methods disclosed in FIGS. 1-3.

Publication Implementation Example

In an operational implementation of the present invention, two distinct handheld users are able to maintain information about one another's schedules using the present invention. As will be appreciated by those skilled in the art, the present invention and implementation is not limited to any particular type of device for this implementation, however. For instance, a first user is able to configure the first handheld device using the publication method of the present invention to export all events to the second user. The second user is also able to configure the second handheld device using the publication method of the present invention to export all events to the first user.

In so doing, each user has made the files available to the other via one or more shared network files that are updated automatically whenever the corresponding desktop calendar is modified manually, over a network, or via synchronization from the handheld device.

The first user is also able to obscure the program field (i.e., Notes field for instance) on the first user's events by exporting it as a blank field. The exporting of a blank field is appropriate as the second user is not in need of the information of the event details of the first user; however, if additional information were needed, rule set changes would permit the additional information to be available to the second user if authorized by the first user and accepted by the second user.

The first user also obscures the description of private events (i.e., marking as "Unavailable"). The second user is also able to obscure the program field for export purposes. The second user also elects to leave every field blank for items in the second user's "Company" category except for the event description field which the second user elects to map to Company Meeting, of which the first user is not interested in or may not have appropriate privilege to receive based on the rule sets.

The second user subscribes to the first user's calendar and maps all of the first user's events to a category named after the first user (for example) and the first user subscribes to the second user in a similar manner mapping events in the second user's calendar to a category named after the second user (for example).

Thereafter, at each synchronization or in the event a handheld device polls new data via a URL over wireless internet or has a new published schedule pushed to it, irrespective of the synchronization technology, each user will have the existing events in the designated category removed and replaced by the latest version of the events in the other's calendar, in accordance with rule sets while maintaining all events in their own calendars that belong to different categories.

Examples of filtering within the publication scheme include but are not limited to:

1. Include events whose category is "ABC Company" or category is "Personal."

2. Exclude events that are flagged as "Private."

The present invention further incorporates by reference the teaching and disclosure of "A Query Predicate Generator to Construct a Database Query Predicate from Received Query Conditions," filed Jul. 16, 2007, having U.S. patent application Ser. No. 11/778,622, which is supportive to the present invention by providing user selected fields, operators and values which those skilled in the art will readily be incorporated into further implementations of the present invention.

Figure 4:
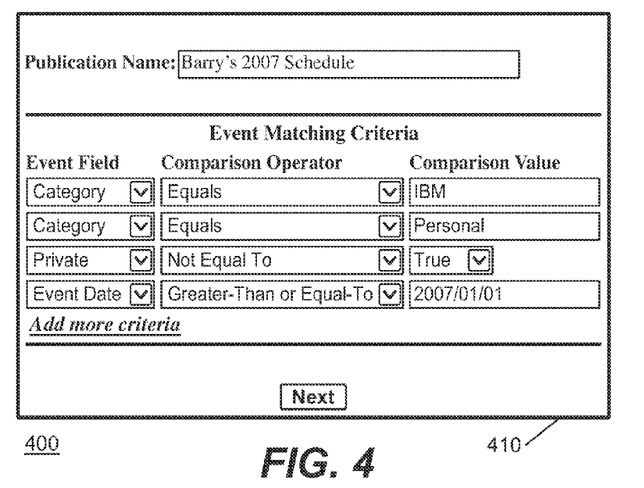
FIG. 4 depicts a screen to define a search predicate as part of a publication definition for qualifying calendar events for inclusion in the publication of the present invention in accordance with one or more implementations thereof.

For instance, by incorporating the method as above, logical operators may be inferred for database query predicates, and operationally a sequence such as follows is foreseen by the present invention. Operatively, a wizard of the present invention would include one or more of the following illustrations with explanations which are instructive for additional implementations of the present invention. FIG. 4 depicts a screen 400 of a wizard to define a search predicate to qualify calendar events for inclusion in the publication as part of a publication definition for qualifying calendar events for inclusion in the publication of the present invention in accordance with one or more implementations thereof.

From FIG. 4, a search predicate would be created from the entries on the screen at 410 that would resolve to:

(Category='IBM' OR Category='Personal') AND (Private='True') AND (EventDate>=DATE('2007/01/01'))

In accordance with one or more implementations of the present invention, where one or more sets of transformation operators and algorithms are available for use, the present invention performs predetermined transformations based on rule sets to transform the calendar events that match the query predicate of FIG. 1 to transform the fields of the matching events. In one aspect, the performance of these acts may be done by the publisher to mask fields that the publisher does not want to be visible in order to keep confidential information secured or it may simply be done to make the events more consumable to subscribers. By example and not by way of limitation, examples of certain transforms include:

1. Set the event title to "Company Meeting" if the category of the event is "Company."
2. Set the event title to "Appointment with patient" if the category of the event is "Appointment" or set to "At [Location]" if the category of the event is "Hospital Visit."
3. Exclude the "Notes" field of the event, where perhaps the publisher wants to hide personal notes.

From the sequence, FIG. 5 depicts a screen 500 to define a transformation rule set as part of a publication definition for modifying or excluding the content of fields of calendar events included in the publication of the present invention in accordance with one or more implementations thereof. The active screen 510 is set forth with the fields discussed above.

Further, where a user base for the subscribers is predetermined and there exists one or more notable ways in which to identify the subscribers (e.g.: user name, email address, IP address, or mobile telephone number) present invention is able to optionally associate an access control list with the publication so that the list of users who have access to specific publications is controlled. This present invention is capable of implementing this option with a calendar client that has a shared user base (such as web-based calendars or desktop calendars such as Lotus Notes). Similarly, it may also be implemented when publishing calendars on an access-controlled website that requires login. It can further be implemented with a shared LDAP Directory of users that the publication component or agent has access to. Where an access control list is specified, for instance, the entire content of the publication may be visible to each user who had access, but what is included in the content of the publication is still controlled by the publisher, hence there can be multiple publications of the same events with varying degrees of detail made in each and different access rights to each of those publications.

Figure 6:
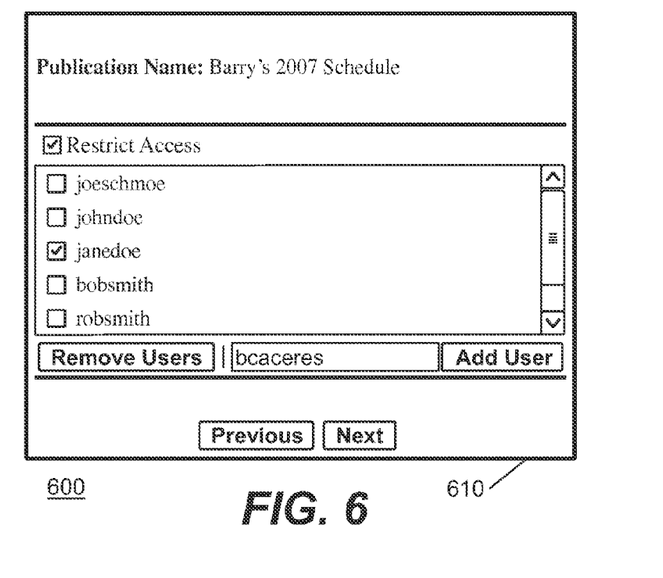
FIG. 6 depicts a screen to define an access control specification as part of a publication definition for restricting access to the publication of the present invention in accordance with one or more implementations thereof.

Thus, using the present invention, the publisher may control who may see the more detailed versions of the events by controlling who can see which publication. This is preferable to traditional approaches, in part, as the present invention avoids the setup of hard-to-manage security rules on specific event fields on a by-event basis. FIG. 6 depicts a screen 600 to define an access control specification as part of a publication definition for restricting access to the publication of the present invention in accordance with one or more implementations thereof. At 610 is an active screen of FIG. 6.

In a further implementation where a medium exists by which subscribers can access publications (e.g.: a local or network file system, local area network, WiFi, Bluetooth, IR, the Internet, wireless Internet service, or PDA synchronization conduit) the present invention in one or more implementation can provide one or more options for making a calendar publication available to subscribers. For instance, possible options might include:

1. Store the publication as a file on disk;
2. Make the publication available on-demand to PDA users who synchronize with this machine;
3. Upload the publication to a website as an update to an RSS feed; and,
4. Upload the publication to the publisher's blog as a posting.

Figure 7:
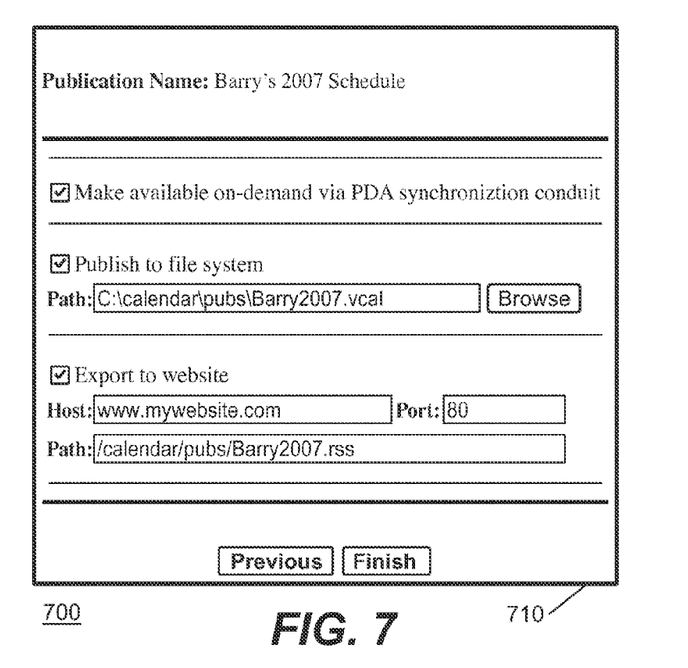
FIG. 7 depicts a screen for defining one or more mediums for publishing a publication of the present invention in accordance with one or more implementations thereof.

FIG. 7 depicts a screen 700 for defining one or more mediums for publishing a publication of a publication of the present invention in accordance with one or more implementations thereof. At 710 is an active screen of FIG. 7.

The steps enumerated for the publication of a group of calendar events in the present invention are not necessarily restricted to a particular order or sequence. For instance, changing the sequence of steps or omitting one or more steps is possible within the scope of the present invention. For example, one publication tool might not provide the ability to modify or exclude the content of calendar event fields. Another publication tool may not include any step for specifying an access control list.

Subscription Implementation Example

In an operational implementation of the present invention, importing the published events from a publication via subscription is provided for. In this operational example, a medium exists for accessing calendar publications (e.g.: a local or network file system, local area network, WiFi, Bluetooth, IR, the Internet, wireless Internet service, or PDA synchronization conduit). In this manner, a subscriber would use the present invention to specify publications to which desired to subscribe to and the events from those publications would thereafter be imported directly into the subscriber's calendar. A first aspect of the subscription methodology, in one or more implementations of the present invention, would permit the subscriber to register publications as subscriptions. For example, registrations may be performed by one or more of:

1. Choosing the name of a subscription from a list of known publications when publisher and subscriber are sharing the same machine;
2. Specifying the host and port on which a network service is running along with the name or path of the publication desired;
3. Specifying a URL (e.g.: to an RSS feed) for obtaining updated copies of the publication; and,
4. Specifying a file path to a local or network file system for a publication that will be checked periodically (or upon the occurrence of an event such as PDA synchronization) for updates.

FIG. 8 depicts a screen 800 defining the medium for subscribing to a publication in the subscription definition of the present invention in accordance with one or more implementations thereof. At 810 is an active screen of FIG. 8.

A following aspect of the present invention involves qualifying events for inclusion or exclusion from the subscription. For example, it may be desirous to exclude events whose title does not start with a certain prefix. FIG. 9 depicts a screen 900 for defining criteria to qualify events for inclusion in or exclusion from the subset of events from the publication that make up the subscription of the present invention in accordance with one or more implementations thereof. Each of these preferences may be set forth in a rule set for instance. At 910 is an active screen of FIG. 9.

A further aspect of the present invention then, with one or more transformation operators and algorithms available, maps the incoming events from the publication to the subscriber's calendar. A single transformation is performed as part of the present invention being at least the mapping of the "Category" field of the event to a target category in the subscriber's calendar. The replacement of the category field is a key element of the import. The specified category must be distinct and must be used exclusively for events from the subscription (i.e.: this category should not be used for multiple subscriptions or for the subscriber's own calendar events). Upon synchronization of the publication with the subscriber's calendar, the existing events for the subscription category are all deleted and replaced by those being imported from the publication (hence the source overwrites target for one specific category).

As known, existing calendar programs support at least one category per event, the present invention does not require modification to existing calendar software. Further, many calendar programs provide the ability to hide or view events by selection of one or more categories, thus multiple publications can be easily managed and viewed within the subscriber's calendar client software. Other event fields can optionally be transformed as well by the subscriber. For example, transformations that a subscriber may want to perform may include:

1. Prefix the event title with the publisher's name for all events (e.g.: prefix with "Football Blue:" for all events so the result might be "Football Blue: @ Red Team");
2. Replace the event title with "Dave: Work Meeting" if the source category is known and is set to "ABC Company" or if the event title is "Company Meeting."

Figure 10:
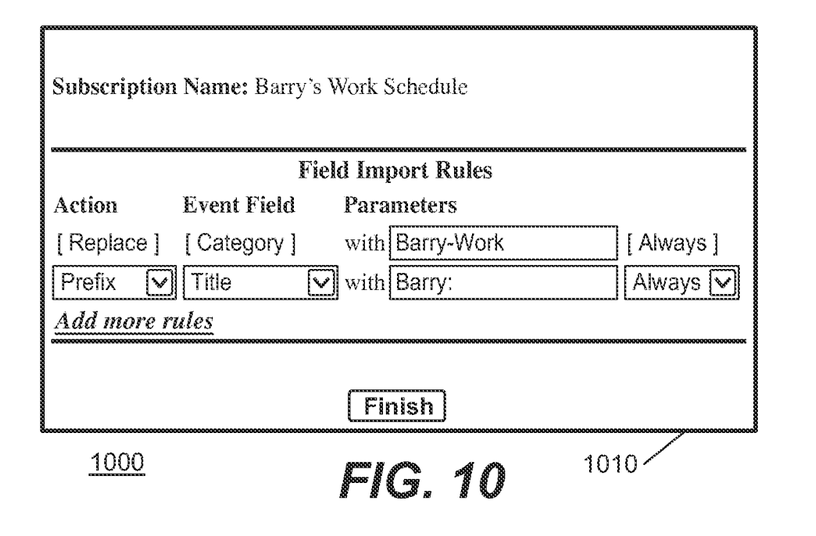

An alternate implementation of the present invention may further involve maintaining the source category of the event and pre-pending a prefix and/or appending a suffix to the source category, and thereafter deleting all events in the subscriber calendar whose category begins with that prefix and/or ends with that suffix during synchronization. FIG. 10 depicts a screen 1000 for modifying or excluding the content of fields of calendar events from the publication for the subscription of the present invention in accordance with one or more implementations thereof. At 1010 is an active screen of FIG. 10.

In a further implementation, it is envisioned that the subscriber user base may be known to the publisher and that the subscriber may also need to specify a user name and password or some other credentials when subscribing to a publication. Provision of associated access is understood to be a part of the present invention as well to gain access to a restricted publication.

Accordingly, a system and method in accordance with one or more embodiments has several advantages that are described below.

Provides for a loosely coupled model that does not require the owner (publisher) of the calendar events of interest to know the identities of the interested parties for those events (subscribers) in order to share them.

Provides for a platform-independent mechanism for sharing a group of different calendar events (publications) between calendar software from various vendors without modification to the calendar databases or inner workings of existing vendor calendar software.

Allows for the defining of a group of different calendar events (publications) to be shared without having to individually pick and choose the calendar events, but rather by defining criteria that qualifies calendar events for inclusion within the group and by doing so providing a means of easily excluding confidential or non-essential calendar events from the publication.

Allows for the defining of multiple overlapping or distinct publications of calendar events from one calendar to be shared with potentially different targeted groups of interested parties (subscribers).

Allows for the propagation of changes made by the publisher to one or more different calendar events to subscribers of those calendar events without requiring the publisher to have knowledge of who is subscribing to those publications and without duplication of the same calendar events within the subscriber calendar.

Allows for a subscriber to synchronize with multiple publications from one or more publishers without pushing subscriber-side calendar events to the publisher source calendars and while maintaining the calendar events from all publications of interest in the subscriber calendar.

Allows the ability to restrict access to a publication of calendar events when the authorized user base is known to the publisher.

Allows the publisher to have fine-grained control over the visibility and content of fields of calendar events within a publication so that the shared version of each calendar event may exclude confidential or non-essential information when obtained by subscribers.

Allows the subscriber to have the ability to specify criteria for qualifying calendar events from a publication for inclusion in the subset of calendar events for which the subscriber has an interest and excluding those events not contained in that subset of the publication during the synchronization process.

Allows the subscriber to have fine-grained control to customize the content of imported calendar events from publishers using rules-based per-publication or global preferences where the rules are re-applied upon synchronization so subscriber changes based on preferences are not lost when changes from the publisher are synchronized.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

Similarly, the present invention in one or more implementations, is not limited to the field entries or visual depictions of figures referenced herein, nor is a sequence necessarily restricted to a particular order except if otherwise expressly set forth. For example, specific field entries in screen implementations of certain figures may differ from referenced textual descriptions to further demonstrate the various implementations and breadth of the present invention without deviating from the spirit and scope of the present invention.

Various implementations of a subscription and publication system, method and program product have been described. Nevertheless, one of ordinary skill in the art will readily recognize that various modifications may be made to the implementations, and any variations would be within the spirit and scope of the present invention. For example, the above-described process flow is described with reference to a particular ordering of process actions. However, the ordering of many of the described process actions may be changed without affecting the scope or operation of the invention. Accordingly, many modifications may be made by one of ordinary skill in the art without departing from the spirit and scope of the following claims.

What is claimed is:

1. A computer-implemented method for providing a calendar publication, the computer-implemented method comprising:
    defining, based on input from a user, one or more calendar publication definitions including: (i) an identifier for the calendar publication and (ii) a set of criteria for qualifying calendar events from a calendar database for inclusion in or exclusion from the calendar publication, the set of criteria including one or more query conditions;
    activating a publication agent for processing each calendar publication definition by applying the respective qualifying criteria to the calendar database in order to identify a subset of qualified calendar events from the calendar database to include in the calendar publication and resulting in one or more calendar events in the calendar database being excluded from the calendar publication, wherein applying the qualifying criteria includes constructing a database query from the one or more query conditions, wherein the calendar publication is uniquely identifiable and exists independently of any subscriber count thereto;
    aggregating the qualified calendar events into the calendar publication; and
    making the calendar publication available for subscription, without first requiring a publisher of the calendar publication to ascertain any subsequent subscriber to the calendar publication, wherein the calendar publication is platform-independent relative to at least one of: (i) a plurality of calendaring database platforms and (ii) a plurality of calendaring client platforms.

2. A computer-implemented method for subscribing to a calendar publication, the computer-implemented method comprising:
    providing the calendar publication, which includes a subset of calendar events from a source calendar database and qualified based on a set of criteria including one or more query conditions;
    defining, based on user input, one or more calendar subscription definitions including: (i) an identifier for the subscription; (ii) a locator or identifier to find and access the calendar publication, from a source calendar database, the subset excluding at least one calendar event in the source calendar database, wherein the calendar publication is uniquely identifiable and exists independently of any subscriber count thereto; and (iii) a transformation rule to map the calendar events from the calendar publication to one or more categories in a subscriber calendar; wherein the calendar publication is made available for subscription, without first requiring a publisher of the calendar publication to ascertain any subsequent subscriber to the calendar publication, wherein the calendar publication is platform-independent relative to at least one of: (i) a plurality of calendaring database platforms and (ii) a plurality of calendaring client platforms;
    activating a subscription agent for processing each calendar subscription definition by removing existing events in the subscriber calendar that belong to the one or more categories to which calendar events from the calendar publication may be mapped;
    transforming the calendar events according to the defined transformation rule in order to map the category of each event to the one or more subscriber categories for the calendar publication; and
    loading the transformed calendar events from the calendar publication into a calendar database, with the mapped category values, of a subscriber.

3. A computer readable medium containing computer program instructions for providing a calendar publication, the program instructions for:
    defining, based on user input, one or more calendar publication definitions including: (i) an identifier for the calendar publication and (ii) a set of criteria for qualifying calendar events from a calendar database for inclusion in or exclusion from the calendar publication, the set of criteria including one or more query conditions;
    activating a publication agent for processing each calendar publication definition by applying the qualifying criteria to the calendar database in order to identify a subset of qualified calendar events from the calendar database to include in the calendar publication and resulting in one or more calendar events in the calendar database being excluded from the calendar publication, wherein applying the qualifying criteria includes constructing a database query from the one or more query conditions, wherein the calendar publication is uniquely identifiable and exists independently of any subscriber count thereto;
    aggregating the qualified calendar events into the calendar publication; and
    making the calendar publication available for subscription, without first requiring a publisher of the calendar publication to ascertain any subsequent subscriber to the calendar publication, wherein the calendar publication is platform-independent relative to at least one of: (i) a plurality of calendaring database platforms and (ii) a plurality of calendaring client platforms.

4. A computer readable medium containing computer program instructions for subscribing to a calendar publication, the program instructions for:
    providing the calendar publication, which includes a subset of calendar events from a source calendar database and qualified based on a set of criteria including one or more query conditions;
    defining, based on user input, one or more calendar subscription definitions including: (i) an identifier for the subscription; (ii) a locator or identifier to find and access the calendar publication, from a source calendar database, the subset excluding at least one calendar event in the source calendar database, wherein the calendar publication is uniquely identifiable and exists independently of any subscriber count thereto; and (iii) a transformation rule to map the calendar events from the calendar publication to one or more categories in a subscriber calendar; wherein the calendar publication is made available for subscription, without first requiring a publisher of the calendar publication to ascertain any subsequent subscriber to the calendar publication, wherein the calendar publication is platform-independent relative to at least one of: (i) a plurality of calendaring database platforms and (ii) a plurality of calendaring client platforms;
    activating a subscription agent for processing each calendar subscription definition by removing existing events in the subscriber calendar that belong to the one or more categories to which calendar events from the calendar publication may be mapped;

transforming the calendar events according to the defined transformation rule in order to map the category of each event to the one or more subscriber categories for the calendar publication; and loading the transformed calendar events from the calendar publication into a calendar database, with the mapped category values, of a subscriber.

5. The computer-implemented method of claim 1, wherein each calendar publication definition further comprises one or more transformation rules for transforming the data contained in fields of the qualified calendar events from the calendar database, wherein processing each calendar publication definition by the publication agent further comprises applying the respective one or more transformation rules to the qualified calendar events so that field values of the qualified calendar events are transformed before inclusion in the calendar publication.

6. The computer-implemented method of claim 1, wherein the calendar publication definition further comprises an access control list identifying subscribers who are authorized to access the calendar publication, wherein the publication agent includes the access control list from the respective calendar publication definition in each generated calendar publication so that unauthorized access to restricted publications is prevented when an attempt is later made by a subscriber to access the publication.

7. The computer-implemented method of claim 1, wherein the calendar publication is provided without requiring modification to any of the calendaring databases and without requiring modification to any of the calendaring clients.

8. The computer-implemented method of claim 1,
wherein the set of criteria include a plurality of conditions including the one or more conditions, wherein the database query includes a database query predicate generated from the plurality of query conditions using a query predicate generator, wherein each query condition includes a comparison operator and a comparison value for a database attribute, wherein the comparison operator comprises at least one of a matching operator, a non-matching operator, and a range operator, wherein the plurality of query conditions include:
  (i) a first query condition having a first comparison operator selected from a greater-than operator and a greater-than-or-equal-to operator, wherein the first comparison operator is associated with a first comparison value; and
  (ii) a second query condition having a second comparison operator selected from a less-than operator and a less-than-or-equal-to operator, wherein the second comparison operator is associated with a second comparison value; and
wherein the first condition and the second condition are determined to belong to a first parenthesized group;
executing a query predicate generator in order to programmatically determine, based on the query conditions, at least one logical operator to include between the query conditions, wherein the first parenthesized group having the first comparison operator and the second comparison operator is modified based on the at least one logical operator, wherein determining the at least one logical operator comprises:
  upon determining that the first comparison value is less than the second comparison value, chaining the first and second query conditions with a logical AND operator; and
  upon determining that the first comparison value is greater than the second comparison value, chaining the first and second query conditions with a logical OR operator; and
programmatically generating at least one database query predicate to include in a database query to apply against the database for obtaining a set of query results, wherein the database query includes the received query conditions chained using the determined at least one logical operator.

9. The computer-implemented method of claim 2, where the transformation rule for mapping the calendar events to one or more specific categories in a calendar subscription definition maps all calendar events contained in the designated publication for that calendar subscription definition to a single specified category wherein the subscription agent performs the removal process for such a calendar subscription definition by removing all existing events in the subscriber calendar that belong to that specified one category for that calendar subscription definition before loading the calendar events from the defined publication of that calendar subscription definition.

10. The computer-implemented method of claim 2, where the transformation rule for mapping the calendar events to one or more specific categories in a calendar subscription definition determines the mapped category for each calendar event contained in the designated publication for that calendar subscription definition by deriving the category value by pre-pending/appending a prefix and/or suffix, respectively, to a source field from calendar event, wherein the subscription agent performs the removal process for such a calendar subscription definition by removing all existing events whose categories start with and/or end-with the designated prefix and/or suffix, respectively, for that calendar subscription definition before loading the calendar events from the defined publication of that calendar subscription definition.

11. The computer-implemented method of claim 2, where the calendar subscription definition further comprises one or more additional transformation rules for transforming the data contained in fields of the calendar events from the publication, wherein processing each calendar subscription definition by the subscription agent further comprises applying the one or more additional transformation rules to the calendar events so that the field values of the qualified calendar events are transformed before loading them into the calendar database.

12. The computer readable medium of claim 3, wherein each calendar publication definition further comprises one or more transformation rules for transforming the data contained in fields of the qualified calendar events from the calendar database, wherein processing each calendar publication definition by the publication agent further comprises applying the respective one or more transformation rules to the qualified calendar events so that field values of the qualified calendar events are transformed before inclusion in the calendar publication.

13. The computer readable medium of claim 4, where the transformation rule for mapping the calendar events to one or more specific categories in a calendar subscription definition maps all calendar events contained in the designated publication for that calendar subscription definition to a single specified category, wherein the subscription agent performs the removal process for such a calendar subscription definition by removing all existing events in the subscriber calendar that belong to that specified one category for that calendar subscription definition before loading the calendar events from the defined publication of that calendar subscription definition.

14. The computer readable medium of claim 4, where the transformation rule for mapping the calendar events to one or more specific categories in a calendar subscription definition determines the mapped category for each calendar event contained in the designated publication for that calendar subscription definition by deriving the category value by prepending/appending a prefix or suffix, respectively, to a source field from calendar event, wherein the subscription agent performs the removal process for such a calendar subscription definition by removing all existing events whose categories start with or end-with the designated prefix or suffix, respectively, for that calendar subscription definition before loading the calendar events from the defined publication of that calendar subscription definition;
  wherein the calendar subscription definition further comprises one or more additional transformation rules for transforming the data contained in fields of the calendar events from the publication, wherein processing each calendar subscription definition by the subscription agent further comprises applying the one or more additional transformation rules to the calendar events so that the field values of the qualified calendar events are transformed before loading them into the calendar database.

15. The computer-implemented method of claim 5, where the calendar publication definition further comprises one or more transformation criteria for determining whether or not the transformation rules should be applied to a qualified calendar event from the calendar database, wherein the publication agent, for each calendar publication definition, evaluates the one or more transformation criteria for each qualified calendar event before conditionally applying the relative transformation rules to the qualified calendar events that meet the required transformation criteria.

16. The computer-implemented method of claim 7, wherein a plurality of distinct calendar publications is provided, including the calendar publication, wherein the plurality of distinct calendar publications overlap in terms of inclusion of at least one calendar event, wherein the calendar publication supports propagating a change by the publisher without requiring the publisher to first ascertain any subscribers and without causing any calendar event in the calendar publication to be duplicated, wherein the plurality of calendar publications facilitates synchronization to provide one or more latest updates to one or more subscribers and without pushing any subscriber-side calendar events to the plurality of calendar publications.

17. The computer-implemented method of claim 8, wherein constructing the database query predicate further comprises:
  determining at least one parenthesized group including the first parenthesized group, wherein each of the at least one parenthesized group includes at least one query condition providing at least one comparison operator and value for the same database attribute;
  wherein query conditions within each group having multiple query conditions are processed to determine at least one logical operator to chain the query conditions in the respective group; and
  for parenthesized groups having multiple query conditions, generating modified parenthesized groups having the query conditions in the parenthesized group chained with the determined at least one logical operator, wherein the database query predicate comprises the modified parenthesized groups and parenthesized groups having only one query condition;
  wherein determining at least one logical operator to include between the query conditions further comprises, in respective instances:
  upon determining that a comparison operator of a second parenthesized group comprises a matching operator, chaining a first query condition and a second query condition in the second parenthesized group with the logical OR operator; and
  upon determining that a comparison operator of a second parenthesized group comprises a non-matching operator, chaining a first query condition and a second query condition in the second parenthesized group with the logical AND operator.

18. The computer readable medium of claim 12, where the calendar publication definition further comprises one or more transformation criteria for determining whether or not the transformation rules should be applied to a qualified calendar event from the calendar database, wherein the publication agent, for each calendar publication definition, evaluates the one or more transformation criteria for each qualified calendar event before conditionally applying the relative transformation rules to be qualified calendar events that meet the required transformation criteria.

19. The computer-implemented method of claim 16, wherein the publisher is permitted to define and apply qualifying criteria in order to exclude at least a first calendar entry, while the one or more subscribers are also permitted to define and apply respective qualifying criteria independent of and in addition to the qualifying criteria applied by the publisher and in order to exclude at least a second calendar entry, thereby facilitating customization of display of the calendar publication both from a publisher perspective and from a subscriber perspective;
  wherein the calendar publication supports platform-independent access control in terms of limiting access to one or more calendar events and without using any access control functionality specific to any of the calendaring databases, wherein the one or more subscribers are permitted to customize display of the calendar publication using rule-based subscriber preferences that are automatically re-applied upon synchronization.

20. The computer-implemented method of claim 17, wherein constructing the database query predicate further comprises:
  generating a modified parenthesized group by removing at least one query condition from one parenthesized group having range operators that specify a range of database attribute values that are a subset of the range of database attribute values of at least one other query condition in the parenthesized group;
  chaining the modified parenthesized group and at least one unmodified parenthesized group with the logical AND operator, wherein the database query predicate comprises the chained parenthesized groups;
  determining query conditions in a second parenthesized group having query predicates with a "starts-with" operator and at least one additional "starts-with" and/or "equals" ("=") comparison operator and/or a "does-not-start-with" operator and at least one additional "does-not-start-with" and/or "not-equal-to" ("!=") comparison operator; and
  removing from the second parenthesized group those determined query conditions whose at least one specified attribute value is a subset of one of the query conditions having a "starts-with" or "does-not-start-with" operator;

wherein the database query is displayed in a user interface configured to permit a user to modify and view the database query;

receiving user selection in the user interface to execute the database query against the database; and displaying results of executing the database query in the user interface, wherein the results include a set of calendar events qualified for inclusion in the calendar publication.

21. The computer-implemented method of claim 19, wherein each calendar publication definition further comprises one or more transformation rules for transforming the data contained in fields of the qualified calendar events from the calendar database, wherein processing each calendar publication definition by the publication agent further comprises applying the respective one or more transformation rules to the qualified calendar events such that field values of the qualified calendar events are transformed before inclusion in the calendar publication;

wherein the calendar publication definition further comprises one or more transformation criteria for determining whether or not the transformation rules should be applied to a qualified calendar event from the calendar database, wherein the publication agent, for each calendar publication definition, evaluates the one or more transformation criteria for each qualified calendar event before conditionally applying the relative transformation rules to the qualified calendar events that meet the required transformation criteria.

22. The computer-implemented method of claim 21, wherein the publication agent is activated upon subscriber request to obtain one or more calendar publications, wherein the publication agent is activated as a result of a PDA synchronization process and the subscribers are PDA users, wherein the publication agent is automatically activated periodically to update the content of the one or more calendar publications from the most recent data in the calendar database, wherein the publication agent makes the calendar publications available to an external system that will provide the calendar publications to one or more subscribers;

wherein the calendar publication definition further comprises an access control list identifying subscribers who are authorized to access the calendar publication, wherein the publication agent utilizes the access control list from the calendar publication definition to determine which of the one or more calendar publications the requesting subscriber is authorized to access, wherein publication agent only provides the calendar publications for which the current requesting subscriber is authorized to access.

23. The computer-implemented method of claim 22, wherein the publication agent includes the access control list from the respective calendar publication definition in each generated calendar publication and such that unauthorized access to restricted publications is prevented when an attempt is later made by a subscriber to access the publication, wherein at least a first calendaring client of the calendaring clients is configured to subscribe to the calendar publication by:

defining, based on user input, one or more calendar subscription definitions including: an identifier for the subscription; a locator or identifier to find and access the calendar publication, wherein the calendar publication comprises a subset of qualified calendar events from the calendar database; and a transformation rule to map the calendar events from the calendar publication to one or more categories in a subscriber calendar;

activating a subscription agent for processing each calendar subscription definition by removing existing events in the subscriber calendar that belong to the one or more categories to which calendar events from the calendar publication may be mapped;

retrieving the calendar events from the calendar publication;

transforming the retrieved calendar events according to the defined transformation rule in order to map the category of each event to the one or more subscriber categories for the calendar publication; and loading the transformed calendar events from the calendar publication into a calendar database, with the mapped category values, of a subscriber.

24. The computer-implemented method of claim 23, wherein in a first instance, the transformation rule for mapping the calendar events to one or more specific categories in a calendar subscription definition maps all calendar events contained in the designated publication for that calendar subscription definition to a single specified category, in which instance the subscription agent performs the removal process for such a calendar subscription definition by removing all existing events in the subscriber calendar that belong to that specified one category for that calendar subscription definition before loading the calendar events from the defined publication of that calendar subscription definition;

wherein in a second instance, the transformation rule for mapping the calendar events to one or more specific categories in a calendar subscription definition determines the mapped category for each calendar event contained in the designated publication for that calendar subscription definition by deriving the category value by pre-pending/appending a prefix and/or suffix, respectively, to a source field from calendar event, in which instance the subscription agent performs the removal process for such a calendar subscription definition by removing all existing events whose categories start with and/or end-with the designated prefix and/or suffix, respectively, for that calendar subscription definition before loading the calendar events from the defined publication of that calendar subscription definition.

25. The computer-implemented method of claim 24, wherein in a third instance, the calendar subscription definition further comprises one or more additional transformation rules for transforming the data contained in the fields of the calendar events from the publication, in which instance processing each calendar subscription definition by the subscription agent further comprises applying the one or more additional transformation rules to the calendar events so that the field values of the qualified calendar events are transformed before loading them into the calendar database;

wherein in the third instance, the calendar subscription definition further comprises one or more transformation criteria for determining whether or not the transformation rules should be applied to a calendar event from the publication, in which instance processing each calendar subscription definition by the subscription agent further comprises evaluating the one or more transformation criteria for each calendar event before conditionally applying the relative transformation rules to the calendar events that meet the required transformation criteria;

wherein in a fourth instance, the calendar subscription definition further comprises a set of criteria for qualifying calendar events from the publication for inclusion in and/or exclusion from the set of calendar events from the publication that is loaded into a calendar of the subscriber, in which instance processing each calendar subscription definition by the subscription agent further comprises applying the qualifying criteria to identify the subset of calendar events from the publication that will be loaded into the subscriber calendar, wherein the subscription agent does not load those calendar events excluded from that subset into the subscriber calendar.

* * * * *